US009863263B2

(12) United States Patent
Berche et al.

(10) Patent No.: US 9,863,263 B2
(45) Date of Patent: Jan. 9, 2018

(54) TURBINE WHEEL FOR A TURBINE ENGINE

(71) Applicant: SNECMA, Paris (FR)

(72) Inventors: Emmanuel Berche, Vernou la Celle sur Seine (FR); Jean-Luc Bacha, Paris (FR); Tangi Brusq, Fontainebleau (FR); Jean-Pierre Mareix, Chartrettes (FR)

(73) Assignee: Snecma, Paris (FR)

( * ) Notice: Subject to any disclaimer, the term of this patent is extended or adjusted under 35 U.S.C. 154(b) by 1446 days.

(21) Appl. No.: 13/659,141

(22) Filed: Oct. 24, 2012

(65) Prior Publication Data
US 2013/0108467 A1 May 2, 2013

(30) Foreign Application Priority Data

Oct. 28, 2011 (FR) ...................................... 11 59860

(51) Int. Cl.
F01D 5/10 (2006.01)
F01D 11/00 (2006.01)
F01D 5/26 (2006.01)
F01D 5/30 (2006.01)

(52) U.S. Cl.
CPC .............. F01D 11/008 (2013.01); F01D 5/26 (2013.01); F01D 5/3053 (2013.01); F05D 2240/81 (2013.01); Y02T 50/676 (2013.01)

(58) Field of Classification Search
CPC ............. F01D 11/008; F01D 5/22; F01D 5/26
See application file for complete search history.

(56) References Cited

U.S. PATENT DOCUMENTS

| 4,457,668 A | 7/1984 | Hallinger |
| 5,244,345 A | 9/1993 | Curtis |
| 5,281,097 A * | 1/1994 | Wilson .................... F01D 5/081 415/115 |

(Continued)

FOREIGN PATENT DOCUMENTS

| EP | 0 062 558 A1 | 10/1982 |
| EP | 1 164 253 A1 | 12/2001 |

(Continued)

OTHER PUBLICATIONS

French Preliminary Search Report dated Jul. 6, 2012, in French 1159860, filed Oct. 28, 2011 (with English Translation of Categories of Cited Documents).

Primary Examiner — Craig Kim
Assistant Examiner — Jason Fountain
(74) Attorney, Agent, or Firm — Oblon, McClelland, Maier & Neustadt, L.L.P.

(57) ABSTRACT

A turbine wheel for a turbine engine is provided. The turbine wheel includes a disk carrying blades including internal channels for passing a flow of cooling air, each blade having a platform carrying an airfoil and connected by a tang to a root. The blade roots are engaged in grooves in the periphery of the disk and their tangs define between them spaces for housing sealing and damping members, which cooperate with the inside faces of the platforms to define air flow cavities. The tangs of at least some of the blades include cooling air outlet orifices that open out both into internal channels in the blades and into the cavities.

6 Claims, 3 Drawing Sheets

(56) References Cited

U.S. PATENT DOCUMENTS

| | | | | |
|---|---|---|---|---|
| 6,017,189 | A | * | 1/2000 | Judet ........................ F01D 5/081 |
| | | | | 416/193 A |
| 6,457,935 | B1 | * | 10/2002 | Antunes ................ F01D 11/008 |
| | | | | 415/115 |
| 2004/0165983 | A1 | | 8/2004 | Elliott et al. |
| 2005/0175463 | A1 | | 8/2005 | Giot et al. |
| 2007/0134099 | A1 | * | 6/2007 | Lee .......................... F01D 5/22 |
| | | | | 416/193 A |
| 2009/0263235 | A1 | * | 10/2009 | Tibbott ................ F01D 11/008 |
| | | | | 415/116 |
| 2012/0269650 | A1 | | 10/2012 | Berche et al. |

FOREIGN PATENT DOCUMENTS

| | | |
|---|---|---|
| EP | 1 452 694 A2 | 9/2004 |
| EP | 1 795 703 A2 | 6/2007 |
| GB | 2 251 897 A | 7/1992 |
| WO | WO 03/102380 A1 | 12/2003 |

* cited by examiner

TURBINE WHEEL FOR A TURBINE ENGINE

BACKGROUND OF THE INVENTION

The present invention relates to a turbine wheel for a turbine engine, the wheel comprising a disk carrying blades having roots engaged in grooves in the periphery of the disk.

Typically, each blade of a turbine wheel comprises an airfoil carried by a platform that is connected to a root by a tang. In general, the blades are formed with internal channels for passing a flow of cooling air (EP A2 1 653 047).

The grooves in the disk are regularly distributed around the axis of the disk, and between them they define teeth. In the assembled position, the platforms of the blades are spaced apart from one another a little in the circumferential direction, and they are spaced apart a little from the teeth of the disk in the radial direction.

The tangs of the blades are spaced apart from one another in the circumferential direction and they define between them spaces in which damper members are mounted in order to dissipate the vibrational energy to which the blades are subjected in operation, by rubbing against their platforms (EP A1 0 062 558).

Those damper members also provide radial sealing between the blade platforms by bearing radially against the radially inner faces of the platforms.

The blades are held axially in the grooves of the disks by means of annular plates that are mounted respectively on the upstream and downstream faces of the disk and that bear axially via their peripheries against the blade roots.

In operation, a leakage air flow referred to as the "bleed" flow passes radially from the inside towards the outside upstream from the upstream plate, and part of that flow is injected into the gas stream through the turbine. Another part of that flow passes axially between the outer periphery of the upstream plate and the blade platforms and flows from upstream to downstream over the teeth of the disk in order to ventilate them.

Proposals have already been made to use this portion of the bleed flow to cool the blade platforms, given that they are subjected to high temperatures in operation. One solution consists in making circuits for passing cooling air through the above-mentioned members that are formed by relatively thick blocks of material. The air that passes in those circuits is designed to strike against the inside faces of the platforms (see for example EP A2 2 110 515). Another solution consists in forming air flow spaces between the inside faces of the platforms and damper members in the form of sheet metal clips, those members being drilled to feed those spaces with air from the bleed flow (FR 11/53373).

Nevertheless, those solutions do not enable accurate control to be obtained over the flows of air for cooling the blade platforms. In the prior art, the air that is used for cooling the platforms comes from a bleed circuit in which the air flow rate is not calibrated, which means that it is not possible to define accurately the flow rates of air used for cooling the blade platforms.

Furthermore, in the prior art, it is not possible to cool certain zones of a blade with the air flowing in the internal channels in the blade. It is not possible to drill orifices in the platform that open out into the internal channels in the blade, since such orifices would be too complicated to make and would need to pass via zones of the blade that are highly stressed in operation and that must therefore not be weakened by drilling (in particular the zones where the platform is connected to the tang of the blade).

A particular object of the invention is to provide a solution to the problems of the prior art that is simple, effective, and inexpensive.

SUMMARY OF THE INVENTION

To this end, the invention provides a turbine wheel for a turbine engine, the wheel comprising a disk carrying blades including internal channels for passing a flow of cooling air, each blade having a platform carrying an airfoil and connected by a tang to a root, the blade roots being engaged in grooves in the periphery of the disk and their tangs defining between them spaces for housing sealing and damping members, which co-operate with the inside faces of the platforms to define air flow cavities, the turbine wheel being characterized in that the tangs of at least some of the blades include cooling air outlet orifices that open out both into internal channels in the blades and into the above-mentioned cavities.

Unlike the above-mentioned bleed air flow, the cooling air in the internal channels of the blades flows at calibrated rates. Feeding the cavities for cooling the blade platforms with air at these calibrated flow rates enables the rates at which air is fed to these cavities to be controlled.

In addition, the invention enables the blade platforms to be cooled with the air flowing in the internal channels of these blades without drilling and weakening critical zones of the blades that are highly stressed in operation.

Each member may comprise a sheet-metal clip in the form of an elongate dish with its convex side facing radially inwards. According to another characteristic of the invention, the convex outer surface of the clip includes at least one setback for co-operating with the corresponding facing surfaces of the tang and of the platform of at least one blade to define a cavity or a pouch.

This setback may be generally L-shaped and comprise a side first portion that extends along one of the side flanks of the clip, and a longitudinal second portion that extends along the top of the clip. The longitudinal portion of the setback may extend under the platform of one blade or under the platforms of two adjacent blades.

The orifices formed in the tangs of the blades may open out into the side portions of the setbacks in the clips.

The blade platform cooling cavities preferably communicate with orifices that are formed in the blade platforms and that open out into the longitudinal portions of the setbacks in the clips.

The air that leaves the orifices in the blade tangs penetrates into the side portions of the setbacks and flows along the cavities to the opposite ends of the setbacks, and then penetrates into the blade platform orifices in order to be ejected subsequently to the outside.

When the setback in a clip extends under the platforms of two adjacent blades, the cavity may serve to feed air to the gap that extends between the longitudinal edges of the platforms of those blades in order to limit penetration through this gap of hot gas from the stream flowing through the turbine engine. The blade platforms then do not necessarily include air outlet orifices from the cavity.

The blade tangs and/or platforms may include projections extending into the above-mentioned cavities. These projections serve to increase the heat exchange areas between the blades and the cooling air, and thus improve cooling performance.

Each member is separated by little or no radial clearance from the inside faces of the blade platforms and by no clearance from the blade tangs. This makes it possible to guarantee good sealing of the cavities between the clips and the blades.

The platform orifices may open out beside the pressure sides and/or the suction sides of the blades.

Finally, the invention provides a turbine engine, such as an airplane turboprop or turbojet, the engine being characterized in that it includes at least one turbine wheel of the above-specified type.

BRIEF DESCRIPTION OF THE DRAWINGS

The invention can be better understood and other details, characteristics, and advantages of the present invention appear more clearly on reading the following description made by way of non-limiting example and with reference to the drawings, in which.

MORE DETAILED DESCRIPTION

Figure 1:
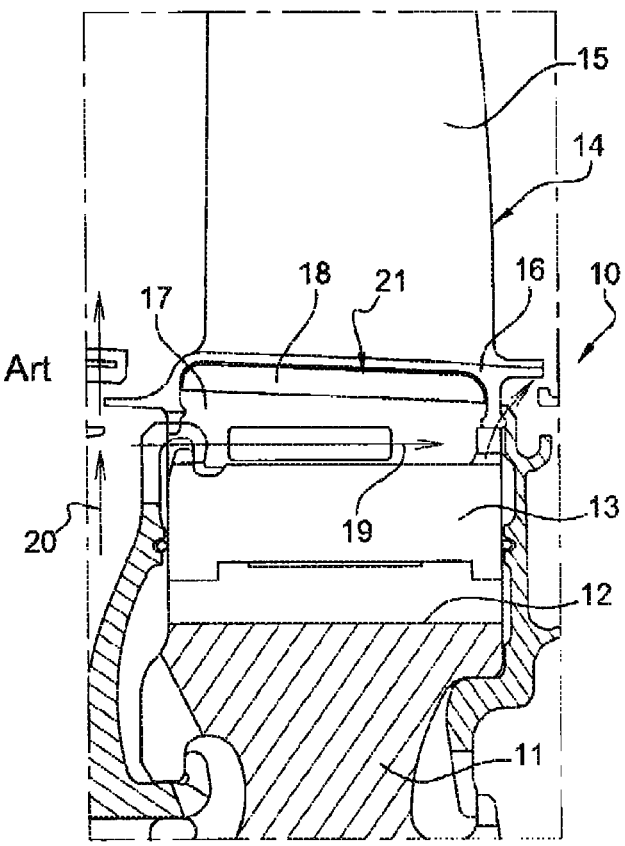
FIG. 1 is a fragmentary diagrammatic view in axial section of a high-pressure turbine wheel of a turbine engine of the prior art.

Reference is made initially to FIG. 1 which shows a high-pressure turbine 10 of a turbine engine such as an airplane, turboprop, or turbojet, the wheel 10 comprising a disk 11 having substantially axial grooves 12 in its periphery for receiving the roots 13 of blades 14.

The blade roots 13 may be of the type having a Christmas-tree section or a dovetail section, and the grooves 12 in the disk 11 are of shape complementary to the shape of the blade roots, and between them they define teeth.

Each blade 14 comprises an airfoil 15 connected at its radially inner end to a platform 16, which is in turn connected to a root 13 by a tang 17.

In the assembled position, as shown in FIG. 1, the platforms 16 of two consecutive blades 14 are spaced apart from each other in the circumferential direction and they are spaced apart in the radial direction from the teeth of the disk. The tangs 17 of the blades are spaced apart from one another in the circumferential direction and between them they define inter-tang spaces in which sheet-metal damper clips 18 are mounted.

Figure 2:
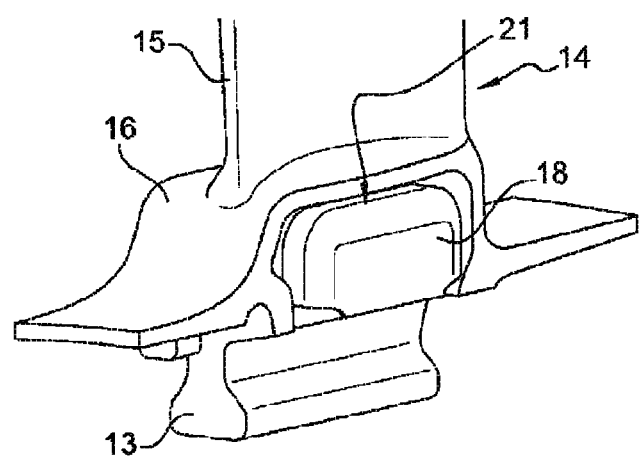
FIG. 2 is a fragmentary diagrammatic view in perspective of a high-pressure turbine blade and a damping clip of the prior art.

As can be seen better in FIG. 2, each clip 18 is generally in the form of an elongate pan or gutter with two substantially parallel side flanks that are connected together at their radially outer ends by an end wall or top having a radially outer surface that is designed to rub against the platform 16 of the blades 14 to dissipate the energy of the vibration to which the blades are subjected in operation.

Each clip 18 may also provide radial sealing in the circumferential clearance between the platforms 16 of the blades 14, by bearing radially outwards against the platforms.

In operation, a bleed flow of air 20 passes radially from the inside towards the outside, upstream from the wheel 10. A portion of this bleed flow is taken and caused to pass axially from upstream to downstream inside the platforms 16 so as to sweep over the radially outer ends of the teeth 13 of the disk (arrow 19).

In operation, the platforms 16 of the blades 14 are subjected to high temperatures, thereby giving rise to considerable temperature gradients in the platforms, which can lead to the formation of cracking, thereby reducing the lifetime of the platforms.

Proposals have already been made to cool the platforms 16 of the blades 14 by a flow of air coming from the bleed flow 20 and passing along cavities 21 formed between the sealing clips 18 and the inside faces of the platforms. Nevertheless, that solution is not entirely satisfactory, in particular because the bleed flow 20 is not at a calibrated rate and it can be difficult to control the flow rate of the air cooling the platforms 16.

The invention enables this drawback to be remedied by feeding the above-mentioned cooling cavities of the blade platforms with the air flowing in the internal channels of the blades for the purpose of cooling them.

Figure 3:
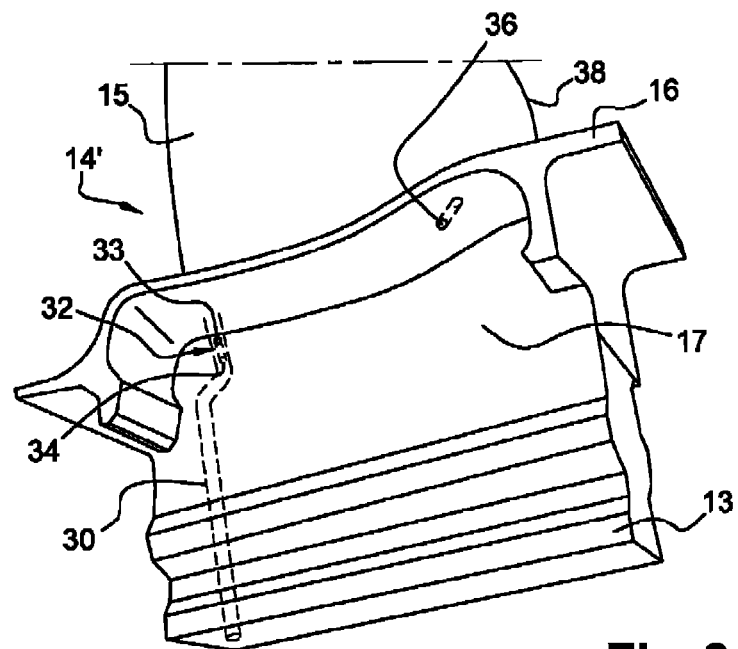
FIG. 3 is a fragmentary diagrammatic view in perspective of a turbine blade of the invention.

A blade 14' of the invention is shown in FIG. 3 and it has internal passages 30 for passing cooling air, these channels (only one of which is shown in dashed lines in FIG. 3) extending along the longitudinal axis of the blade, through its root 13, its tang 17, and its airfoil 15, with their radially inner ends opening out into an inside face of the blade root (on this topic, reference may be made to document EP A2 1 653 047 in the name of the Applicant). These channels 30 are fed with air via their radially inner ends of sections that may be calibrated by means of plates (not shown) fitted on and fastened to the inside face of a blade root 13.

As can be seen in FIG. 3, the tang 17 of the blade 14' has an air outlet orifice 32 opening out at one end 33 into a zone of the tang 17 that is to be covered by a flank of a sealing clip 18' of the invention, and opening out at its other end 34 into one of the internal channels 30 in the blade. In the example shown, the orifice 32 opens out into a channel 30 situated close to the upstream end of the blade root 13.

By way of example, the orifice 32 has a diameter lying in the range 0.35 millimeters (mm) to 0.5 mm, and is capable of delivering air at a rate that represents approximately 1% to 4% of the flow rate of air flowing in the internal channels 30 of the blade. The blade 14' may have more than one orifice 32.

The platform 16 of the blade 14' shown in FIG. 3 also has at least one air exhaust orifice 36 for exhausting the air from the above-mentioned cavity, this air being for ejection via the pressure side or the suction side of the blade airfoil 15. This orifice 36 opens out both in the inside face and in the outside face of the blade platform 16.

The orifice 36 may extend from upstream to downstream radially outwards and may open out at its downstream end in the vicinity of the trailing edge 38 of the airfoil 15 of the blade 14', in order to cool it.

The blade platform 16 may have a plurality of orifices 36 for exhausting air from the cavity, these orifices being oriented parallel to one another, or else in different directions.

Figure 4:
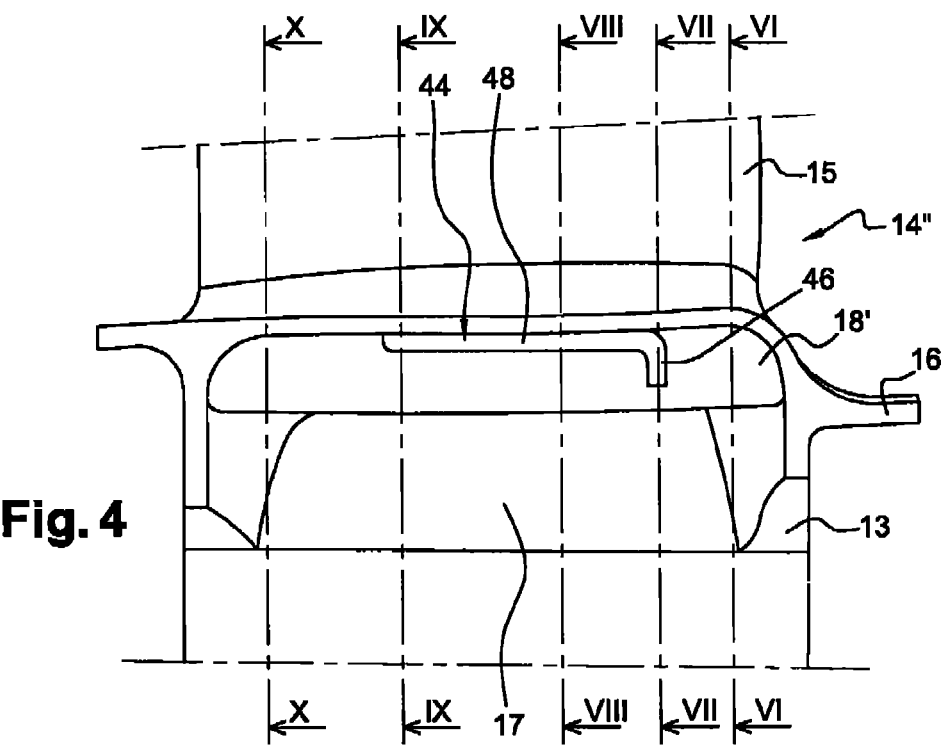
FIG. 4 is a fragmentary diagrammatic view in perspective of a turbine blade and a damping clip of the invention.
Figure 6:
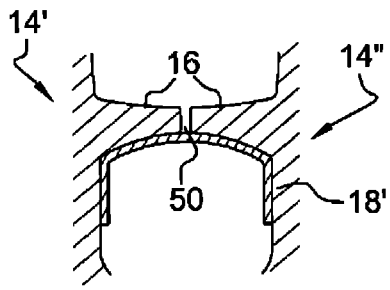
FIGS. 6 to 10 are section views on lines VI-VI to X-X of FIG. 4.
Figure 7:
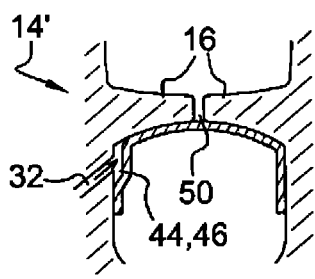
Figure 8:
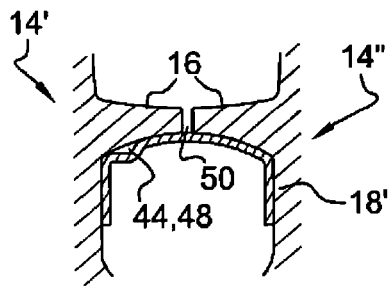

FIG. 4 shows a sealing clip 18' of the invention in which a portion is engaged under the platform 16 of a blade 14" while another portion is designed to be engaged under the platform 16 of the blade 14' of FIG. 3.

Figure 5:
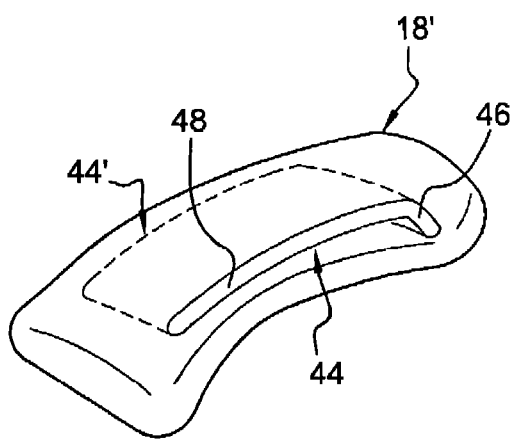
FIG. 5 is a diagrammatic perspective view of a damping clip of the invention.
Figure 9:
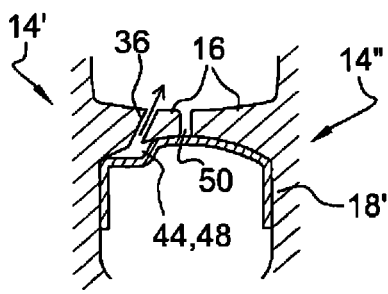
Figure 10:
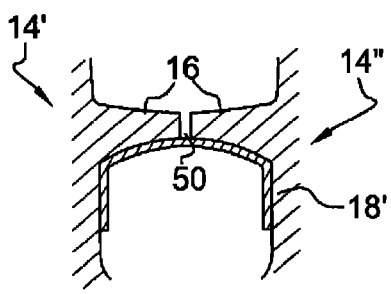

The sealing clip 18', also shown in FIG. 5, differs from the prior art clip shown in FIGS. 1 and 2 in particular that its convex outer surface includes at least one setback 44 that is to co-operate with facing surfaces of the tang 17 and of the platform 16 of the blade 14' to form an air flow cavity.

This setback 44 may be obtained by stamping the clip 18', or it may by obtained by casting.

In the example shown, this setback 44 is generally L-shaped and has a side portion 46 extending along one of the flanks of the clip 18', with the radially outer end thereof being connected to one end of a longitudinal portion 48 extending along the top of the clip or in the zone where the top is connected to the above-mentioned flank of the clip.

The orifice 32 formed in the tang 17 of the blade 14' of FIG. 3 opens out in the radially inner end of the lateral portion 46 of the setback 44 and feeds air to the cavity formed between the clip and the blade 14'. The orifice 36 formed in the platform 16 of this blade 14' opens out into the downstream end of the longitudinal portion 48 of the setback 44 and serves to exhaust air from this cavity.

FIGS. 6 to 10 are section views on lines VI-VI, VII-VII, VIII-VIII, IX-IX, and X-X of FIG. 4, and they show the position of the above-mentioned cavity, and also the way in which the flow section of the cavity varies. By way of example, the cavity has a thickness or depth of the order of 1 mm.

As shown in FIGS. 6 to 10, the flanks of the clip 18' are flush with the tangs 17 of two blades 14' and 14", or they bear circumferentially thereagainst in order to restrict or eliminate leaks of air between the clip 18' and the tangs 17.

Each clip 18 bears radially outwards against circumferential end portions of the platforms 16 of the blades 14' and 14", thereby providing radial sealing between the platforms.

The centrifugal forces that are applied to the clips 18' in operation are greater than the forces exerted by the air flowing in the cavities over the clips, thus guaranteeing that the clips bear radially against the platforms 16 of the blades 14' and 14".

In the above-described embodiment, the setback 44 extends over only a side portion of the clip 18' and is situated radially within one of the platforms 16 of the blades 14' and 14". In a variant, and as shown diagrammatically in dashed lines in FIG. 5, the setback 44' may extend over a major portion of the width of the clip 18' so as to extend radially inside the platforms 16 of both adjacent blades 14' and 14". Under such circumstances, the cavity may be used to feed air to the circumferential clearance 50 (visible in FIGS. 6 to 10) between the longitudinal edges of the platforms 16. The platforms 16 of the blades then do not necessarily include air outlet orifices 36.

In the above-described embodiment, among the two adjacent blades 14' and 14" shown in FIGS. 3 and 4, only the blade 14' of FIG. 3 includes an air outlet orifice 32 in its tang 17 for feeding the above-mentioned cavity, which is situated on one of the sides or flanks of the sealing clip 18'. In the above-mentioned circumstance of the cavity extending over substantially the entire width of the clip 18', it may be fed with air via air outlet orifices 32 provided in the tangs 17 of both adjacent blades 14' and 14".

The orifices 32, 36 in the blades 14', 14" may be obtained by casting or by drilling, e.g. by electrical discharge machining (EDM).

In another variant, not shown, projections may be formed on the radially inner face of the platform 16 and on the side face of the tang 17 of the blade 14', 14", which projections are designed to engage in the above-mentioned cavity. These projections increase the area for heat exchange between the blade and the air flowing in the cavity, thereby improving the cooling performance of the blade. By way of example, the projections may be formed by spikes or studs of substantially hemispherical or cylindrical shape.

The invention claimed is:

1. A turbine wheel for a turbine engine, the turbine wheel having an axis and comprising:
   blades including internal channels for passing a flow of cooling air, each blade having an airfoil, a root, a platform having a radially inner face and which is interposed between the airfoil and the root, and a tang connecting the platform to the root;
   sealing and damping members;
   a disk having grooves at a radial periphery, the blade roots being engaged in said grooves of the disk and the tangs defining therebetween spaces for housing said sealing and damping members; and
   air flow cavities which are defined between at least one of:
      the sealing and damping members and the radially inner faces of the platforms, and
      the sealing and damping members and portions of lateral faces of the tangs,
   wherein the tangs of at least some of the blades include cooling air outlet orifices that open out both into said air flow cavities and into said internal channels defined in the blades,
   wherein each sealing and damping member is a sheet metal clip in the form of an elongate dish having a concave radially inner face facing radially inwards, and a convex radially outer face including at least one setback for co-operating with corresponding facing surfaces of the tang and of the platform of at least one blade to define a recess,
   wherein the sheet metal clip has side flanks extending parallel to the tangs of the blades and a top part that extends between said side flanks,
   wherein the setback in the sheet metal clip is generally L-shaped and includes a side first portion that extends along one of the side flanks of the sheet metal clip, and a longitudinal second portion that extends along the top part of the clip,
   wherein the cooling outlet air orifices formed in the tangs of the blades open out into radially inner ends of the first side portions of the setbacks in the clips, and
   wherein the air flow cavities communicate with air exhaust orifices that are formed in the platforms of the blades and that open out into downstream ends of the longitudinal second portions of the setbacks in the sheet metal clips.

2. The turbine wheel according to claim 1 wherein the orifices in the platforms open out beside at least one of pressure sides or suction sides of the blades.

3. The turbine wheel according to claim 1, wherein at least one of the tangs or the platforms of the blades include projections that extend into the air flow cavities.

4. The turbine wheel according to claim 1, wherein each sealing and damping member is separated:
   by a radial clearance or no radial clearance from the radially inner face of the platforms of the blades, if the corresponding air flow cavity is defined at least between the sealing and damping members and the portions of the corresponding lateral faces of the tangs,
   or by no clearance from the tangs of the blades, if the corresponding air flow cavity is defined at least between the sealing and damping members and the radially inner faces of the platform.

5. A turbine engine, which includes at least one turbine wheel according to claim 1.

6. A turbine wheel for a turbine engine, the turbine wheel having an axis and comprising:
- blades including internal channels for passing a flow of cooling air, each blade having an airfoil, a root, a platform having a radially inner face and which is interposed between the airfoil and the root, and a tang connecting the platform to the root;
- sealing and damping members;
- a disk having grooves at a radial periphery, the blade roots being engaged in said grooves of the disk and the tangs defining therebetween spaces for housing said sealing and damping members; and
- air flow cavities which are defined between the sealing and damping members and portions of lateral faces of the tangs,
- wherein the tangs of at least some of the blades include cooling air outlet orifices that open out both into said air flow cavities and into the internal channels defined in the blades,
- wherein each sealing and damping member is a sheet metal clip in the form of an elongate dish having a concave radially inner face facing radially inwards, and a convex radially outer face including at least one setback for co-operating with corresponding facing surfaces of the tang and of the platform of at least one blade to define a recess,
- wherein the sheet metal clip has side flanks extending parallel to the tangs of the blades and a top part that extends between said side flanks,
- wherein the setback in the sheet metal clip is generally L-shaped and includes a side first portion that extends along one of the side flanks of the sheet metal clip, and a longitudinal second portion that extends along the top part of the clip,
- wherein the cooling outlet air orifices formed in the tangs of the blades open out into radially inner ends of the first side portions of the setbacks in the clips, and
- wherein the air flow cavities communicate with air exhaust orifices that are formed in the platforms of the blades and that open out into downstream ends of the longitudinal second portions of the setbacks in the sheet metal clips.

* * * * *